(12) United States Patent
Redert et al.

(10) Patent No.: US 8,767,046 B2
(45) Date of Patent: Jul. 1, 2014

(54) IMAGE BASED 3D VIDEO FORMAT

(75) Inventors: Peter-Andre Redert, Eindhoven (NL); Reinier B. M. Klein Gunnewiek, Eindhoven (NL); Bartolomeus W. D. Sonneveldt, Eindhoven (NL); Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 394 days.

(21) Appl. No.: 13/139,365

(22) PCT Filed: Dec. 10, 2009

(86) PCT No.: PCT/IB2009/055638
§ 371 (c)(1),
(2), (4) Date: Jun. 13, 2011

(87) PCT Pub. No.: WO2010/070545
PCT Pub. Date: Jun. 24, 2010

(65) Prior Publication Data
US 2011/0242279 A1 Oct. 6, 2011

(30) Foreign Application Priority Data

Dec. 15, 2008 (EP) ..................................... 08171627

(51) Int. Cl.
*H04N 13/00* (2006.01)
(52) U.S. Cl.
USPC ............................................................ 348/43
(58) Field of Classification Search
USPC ............................................................ 348/43
See application file for complete search history.

(56) References Cited

U.S. PATENT DOCUMENTS

| 6,064,424 A | 5/2000 | van Berkel |
| 2004/0032488 A1 | 2/2004 | Harman |

(Continued)

FOREIGN PATENT DOCUMENTS

| EP | 1501317 A1 | 1/2005 |
| EP | 1587329 A1 | 10/2005 |

(Continued)

OTHER PUBLICATIONS

Kauff et al., "Depth map creation and image-based rendering for advanced 3DTV services providing interoperability and scalability", Signal Processing. Image Communication, Elsevier Science Publishers, NL, vol. 22, No. 2, Mar. 16, 2007, pp. 217-234, XP005938670.
J. Shade et al., "Layered Depth Images", ACM SIGGRAPH 98, pp. 231-242.

(Continued)

*Primary Examiner* — Sath V Perungavoor
*Assistant Examiner* — Jeffery Williams
(74) *Attorney, Agent, or Firm* — Larry Liberchuk

(57) ABSTRACT

The present invention relates to a method and device (580) for encoding three-dimensional video data, the device comprising: a first encoder (505) arranged to encode multiple simultaneous views (501) of a scene from different viewpoints; a second encoder (510) arranged to encode depth information of the scene and a third encoder (515) arranged to encode additional information indicative of a relationship between the multiple views and the depth information and a combiner (520) arranged to combine the encoded information into a representation (513) of the three-dimensional video data. The additional information comprises a group classifier indicating whether or not the depth information and at least one of the multiple views correspond to the same source material for, when corresponding, using the depth information and the at least one of the multiple views to render further views of the scene from further different viewpoints. The invention further related to a method and device (585) for decoding three-dimensional video data, as well as a computer program product comprising program instructions for executing a method according to the present invention.

15 Claims, 4 Drawing Sheets

(56) References Cited

U.S. PATENT DOCUMENTS

2006/0146138 A1* 7/2006 Xin et al. ............... 348/207.99
2007/0041442 A1 2/2007 Novelo

FOREIGN PATENT DOCUMENTS

| WO | WO2006137000 A1 | 12/2006 |
| WO | WO2007113725 A2 | 10/2007 |
| WO | WO2008150111 A1 | 12/2008 |
| WO | WO 2009034519 A1 * | 3/2009 |
| WO | WO2009034519 A1 | 3/2009 |

OTHER PUBLICATIONS

Hari Kalva et al., "Design and Evaluation of a 3D Video System Based on H.264 View Coding", Dept. of Computer Science and Engineering, Florida Atlantic University, May 22-23, 2006.

Andre Redert et al., "Philips 3D Solutions: From Content Creation to Visualization", 3D Data Processing, Visualization, and Transmission, Third International Symposium on Volume , Issue , Jun. 2006 pp. 429-431.

Andrfe Millin et al., "Three-dimensions via the Internet", http://www.cs.huji.ac.il/~smartclass/docs/vector_extraction/Three_dimensions_via_the_internet.pdf.

* cited by examiner

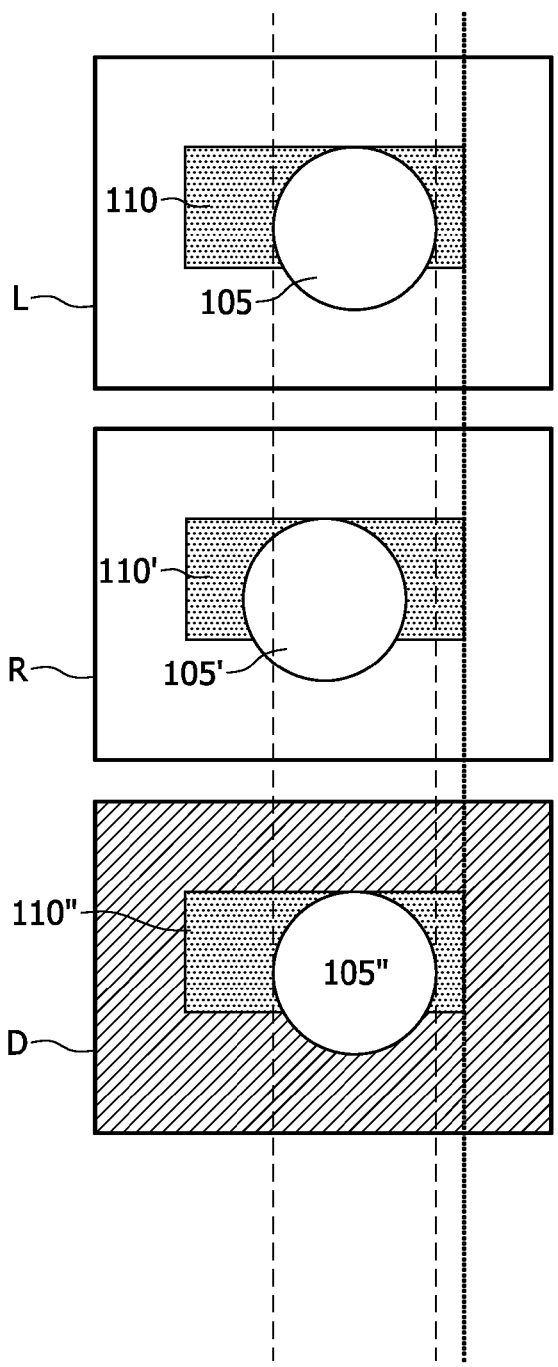
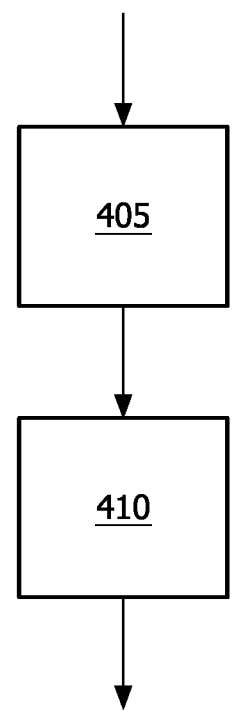
FIG. 2
FIG. 5

IMAGE BASED 3D VIDEO FORMAT

FIELD OF THE INVENTION

The invention relates to a device and method of encoding three-dimensional video data, a device and method for decoding three-dimensional video data and to a signal comprising three-dimensional video data.

BACKGROUND OF THE INVENTION

Over the last two decades a variety of stereoscopic and autostereoscopic display systems have been developed. These systems aim to provide the viewer with a three-dimensional (3D) impression of still and/or motion video images. In general (auto)stereoscopic devices aim to provide the respective left and right eye of a viewer with an appropriate left and right image which when interpreted by the human visual system of the viewer result in a 3D impression.

Stereoscopic display systems comprise active glasses-based systems such as those using shutter glasses. In shutter glasses based systems a display device generally displays left and right images in a time-multiplexed manner. The shutter glasses in turn are operated in synchronization with the display system to allow for the respective left and right images to reach the corresponding eye of the viewer. Other glasses-based systems are passive, such as the polarization glasses used in 3D cinema.

Although the above stereoscopic systems provide what is generally accepted to be a convincing 3D experience, users tend to find the need for special glasses a nuisance. As a result autostereoscopic systems have been developed wherein two or more views are presented simultaneously on the display device. In addition such display systems are fitted with light directing means, such as barriers, or lenticulars, which direct the respective views into different viewing directions. For example, U.S. Pat. No. 6,064,424 presents an example of a lenticular-based autostereoscopic display system.

When a viewer looks at the autostereoscopic display device, he will generally receive two distinct views; one for his left eye and one for his right eye. These images in turn are combined by the human visual system into a 3D impression.

In order for stereoscopic and autostereoscopic devices to provide a high quality 3D impression, it is normal to provide a video signal comprising more than a conventional 2D image. A wide variety of alternatives has already been disclosed. Stereoscopic display devices generally require content to be delivered in a form comprising left and right images in a time-sequential and/or multiplexed manner.

Autostereoscopic displays on the other hand generally require more than two views. For this reason certain display devices require multiple views in a time-sequential and/or multiplexed manner. International Patent Application WO2006/137000 provides an example of another method to encode three-dimensional video data. This particular method of exchange of image data allows the exchange of a conventional 2D image, a corresponding depth image (indicative of the distance of pixels in the viewing direction), and occlusion information. Such information can be used to render one or more views of the image, using techniques such as disclosed in "Layered Depth Images", by J. Shade, et al, ACM SIGGRAPH'98, pp. 231-242.

SUMMARY OF THE INVENTION

Although many different formats exist for the exchange of three-dimensional video data, the characteristics of the respective formats are generally tailored one type of displays device.

The object of the present invention is to facilitate the delivery of three-dimensional video data.

This object is solved by a method of encoding three-dimensional video data, the method comprising encoding of multiple views of a scene from different viewpoints; encoding depth information of the scene and encoding additional information indicative of a relationship between the multiple views and the depth information and combining the encoded information into a representation of the three-dimensional video data, the additional information comprising a group classifier which indicates whether or not the depth information and at least one of the multiple views correspond to the same source material for, when corresponding, using the depth information and the at least one of the multiple views to render further views of the scene from further different viewpoints.

The present invention by means of the additional information simplifies the determination of the manner of use of the three-dimensional video data for a processing device, or a rendering device, when further views (i.e. additional views not present in the encoded data) are to be rendered. By doing so the present invention effectively enables the creation of a more versatile three-dimensional video data format. The method according to the present invention proposes to encode at least two views of a scene from different viewpoints together with depth information of the scene. By including the additional information linking the view information with the depth information via the group classifier, a representation of the three-dimensional video data is obtained that is more versatile than conventional multi-view or image plus depth representations. In fact this particular representation of the three-dimensional video data may be used as input for a larger number of displays, and based on the additional information may in addition simplify and/or improve image rendering.

The present invention proposes to provide the group classifier in the additional information indicating whether there is a link between stereo or multi-view images and depth information in a representation of three-dimensional video data. Consequently, a processing device which receives such a representation of three-dimensional video data can use this information to prevent a degrading of quality by mixing both sources when no such link exists. Moreover when a link exists, the additional information may enable use of view information and depth information during rendering of further views.

In an embodiment the group classifier comprises information indicative of whether the depth information corresponds to disparity information present in at least two of the multiple views. Such information may be useful when deciding whether or not to synthesize additional views for display on an autostereoscopic display when multiple encoded views are provided. Alternatively the depth information e.g. when provided together with a stereo signal may be used for subtitle insertion in the stereo images. Provided that the depth map is representative of the view information, the depth map may be used during subtitle insertion or On Screen Display (OSD) generation, as it provides additional information for determining locations within the scene where subtitle information can be displayed.

When the depth information corresponds to disparity information present in at least two of the multiple views, the actual transform of the depth information into the disparity information may also be provided. Having such information available may further help in subtitle insertion.

In a further embodiment the additional information comprises a view classifier indicating a relationship between the viewpoint of the depth information and the viewpoint of at least one of the multiple views. This view classifier may be used to combine encoded multi-view images with views rendered using image plus depth information. The latter is of particular value when content is provided which includes view information which may be complemented using synthesized views.

In a further embodiment the additional information comprises a group classifier value for each of the multiple views and the depth information, equal group classifier values indicating the correspondence between the viewpoint of the depth information and the respective views. This information, in particular when combined with information indicating whether the disparity in views corresponds to the depth information may be used to select whether or not to render particular views to replace encoded view information.

In a further embodiment the additional information comprises information indicative of the preferred view for rendering the three-dimensional video signal on a display device in two dimensions only.

In a further embodiment the additional information encodes information indicative of a relationship between the multiple views and the depth information for one or more spatial regions in the multiple views and the depth information. By providing additional information for one or more spatial regions rather than, or complementary to, the view in its entirety, this invention may address said regions individually, i.e. at a finer granularity.

The additional information may be provided as labels associated with spatial regions of the image. Such spatial regions may be labeled segments, in which case also a segment description is required. Alternatively the labels may be associated with known image elements, such as elements of an underlying compression scheme; e.g. macro(blocks).

A finer grain representation may be particularly useful when used in combination with partial images or partial depth maps. The use of partial images and/or partial depth maps may enable a further reduction in bandwidth requirements for the coded three-dimensional video data.

The object of the invention is further addressed in a method of decoding three-dimensional video data, the method comprising extracting additional information from a representation of the three-dimensional video data, the additional information indicative of a relationship between multiple views of a scene from different viewpoints and depth information of the scene, the additional information comprising a group classifier which indicates whether or not the depth information and at least one of the multiple views correspond to the same source material, and rendering the three-dimensional video data based on the additional information by, when group classifier indicates correspondence, using the depth information and the at least one of the multiple views to render further views of the scene from further different viewpoints.

The object of the invention is further addressed by a device for encoding three-dimensional video data, the device comprising: a first encoder arranged to encode multiple views of a scene from different viewpoints; a second encoder arranged to encode depth information of the scene and a third encoder arranged to encode additional information indicative of a relationship between the multiple views and the depth information and a combiner arranged to combine the encoded information into a representation of the three-dimensional video data, the additional information comprising a group classifier which indicates whether or not the depth information and at least one of the multiple views correspond to the same source material for, when corresponding, using the depth information and the at least one of the multiple views to render further views of the scene from further different viewpoints.

The object of the invention is further addressed by a device for decoding three-dimensional video data, the device comprising: an extractor arranged to extract additional information from a representation of the three-dimensional video data, the additional information indicative of a relationship between multiple views of a scene from different viewpoints and depth information of the scene, the additional information comprising a group classifier which indicates whether or not the depth information and at least one of the multiple views correspond to the same source material, and rendering means arranged to render the three-dimensional video data based on the additional information by, when group classifier indicates correspondence, using the depth information and the at least one of the multiple views to render further views of the scene from further different viewpoints.

The object of the invention is further addressed by a three-dimensional video signal, the signal comprising encoded multiple views of a scene from different viewpoints and encoded depth information of the scene and encoded additional information indicative of a relationship between the multiple images and the depth information, the additional information comprising a group classifier which indicates whether or not the depth information and at least one of the multiple views correspond to the same source material for, when corresponding, using the depth information and the at least one of the multiple views to render further views of the scene from further different viewpoints. A storage device, e.g. a record carrier, may comprise the three-dimensional video signal.

BRIEF DESCRIPTION OF THE DRAWINGS

Embodiments of the invention will be described, by way of example only, with reference to the drawings, in which FIG. 2, shows the relationship between disparity and depth, FIG. 5, shows a method of decoding three-dimensional video data according to the present invention.

DETAILED DESCRIPTION

Three-dimensional video signals are known from the prior art which comprise either two or more images or views. The image or views correspond with images or views observed from different viewing directions of one and the same scene. Typically, such views are rendered simultaneously on a display device. However, they may also be rendered in a multiplexed manner such that the human eye perceives the images as being substantially simultaneous.

In case of time-multiplexed content rendering, such as e.g. when using shutter glasses, this generally implies interleaving left and right images in an alternating manner at a sufficiently high speed.

Typically a three-dimensional video signal thus encodes at least two views for rendering at a single time instance, or for rendering within a pre-determined time-slot that is perceived as simultaneous. The resulting rendered images subsequently provide a 3D impression when they are routed to the proper eyes of a viewer.

Encoding of stereo content using stereo images is well known. However the use of stereo images or more generally speaking multi-view images, has one important disadvantage; the respective images lock-in the disparity relationship. As a result in particular when displays are only capable of rendering a relatively narrow disparity range this may cause problems when rendering content encoded for a display device having a wider disparity range.

Although it is possible to process the multi-view images in order to match the content disparity to a particular display, this generally involves additional processing.

An alternative solution is to encode three-dimensional video data in the so-called image plus depth format. This format allows additional views to be rendered based on e.g. a frontal image of a scene and corresponding depth information. Such information may also be extended to include e.g. occlusion data. Occlusion data is image information (or depth information) that becomes visible when the scene presented in the frontal image is viewed from a viewing direction other than that of the encoded frontal image. The occlusion data may comprise only view information (e.g. RGB or YUV), but may likewise also include additional occlusion depth information.

A disadvantage of the above format is that in order to be able to perceive a satisfactory 3D experience, views will need to be rendered. However an advantage in doing so is that it also becomes possible to take the disparity range of display devices into account. In addition further information such as subtitles, menus and/or other OSD information may be rendered in the same process.

Relationship Disparity and Depth

Figure 1:
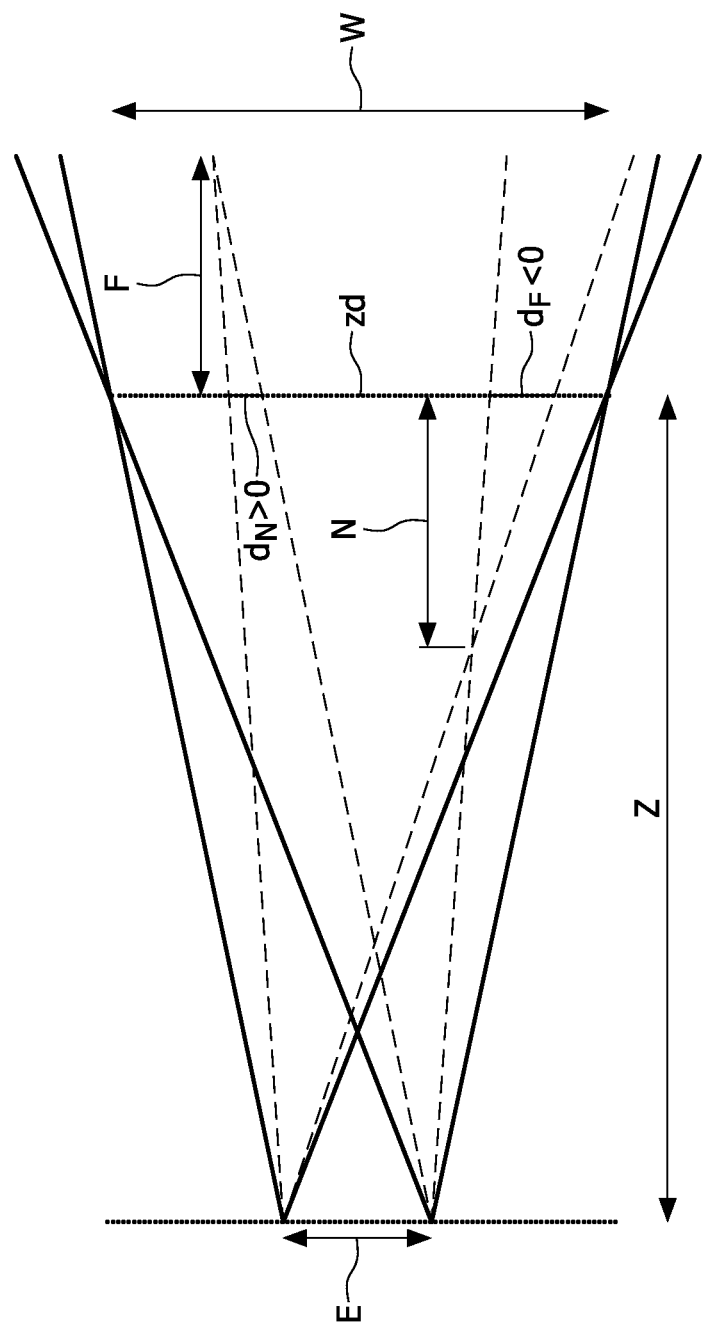
FIG. 1, shows several general concepts and parameters defining disparity.

FIG. 1 illustrates several general concepts and parameters defining disparity. FIG. 1 shows two viewpoints located at the edges of the double arrow E, spaced apart by eye-distance E. At a viewing distance Z, a screen S, represented by a dotted line, is located which is used for displaying three dimensional information. Such a screen in practice may be e.g. a time or spectrum sequential display that alternatively provides an eye of an observer wearing appropriate eye-wear with appropriate image information for the respective view point.

The screen S in FIG. 1 is placed at zero disparity. A planar object located at a depth corresponding to zero disparity will be located in the exact same position in the left image and the right image; hence zero disparity. The double arrow W W indicates the width of the screen. N (near) represents the maximum perceived depth in front of the screen S. Likewise F (far) represents the maximum perceived depth behind the screen S.

The line $d_N$ represents the perceived disparity of an object located at N in front of the screen S, the disparity value $d_N$ here is negative, also referred to as crossed disparity and can be expressed as:

$$d_N = N*E/(Z-N) \quad [1]$$

The line $d_F$ represents the perceived disparity of an object located at F behind the screen S, the disparity value $d_F$ here is positive, also referred to as un-crossed disparity, and can be expressed as:

$$d_F = F*E/(Z+F) \quad [2]$$

In practice the maximum disparity should be below the eye distance E to allow comfortable viewing. In practice the maximum disparity is preferably set to a value below the average eye distance E to allow for variation in eye distance between people.

FIG. 1 illustrates the relation of depth; e.g. for the objects located at position F or N, in relation to disparity. As can be seen in the equations 1 and 2, disparity is inversely proportional to depth.

FIG. 2 further elucidates the relation of disparity and depth within a stereo image and further relates this to depth. Disparity for a pair of stereo images is typically determined relative to a reference. Typically this reference is one of the images.

FIG. 2, shows a pair of stereo images and a depth map. Typically the view information will comprise multiple images, such as the left and right images presented herein. FIG. 2 further shows an image comprising the corresponding depth information. In this example all images are presented at the same resolution. However it is not uncommon for one of the left and/or right images and/or the depth image to be at a lower resolution, thereby reducing the required footprint of the three-dimensional video data. For the sake of clarity here all images and depth images will be considered to be of equal size.

Next the relationship between depth and disparity is further illustrated, using the left and right images of FIG. 2. The left image here will be used as reference image for determining disparity.

Image L represents an image for the left eye comprising two planar objects, a dark square 110 and a bright circle 105. The bright circle partially occludes the dark square indicating that it is positioned in front of the dark square. Image R represents an image for the right eye comprising the same planar objects, the dark square 110' and the bright circle 105'.

In both the left and right image the dark square 110, 110' is located at the same position. This implies that this object is located at the so called zero disparity plane. The white circle 105, 105' is positioned in front of the black square. As a result the white circle in the right eye image appears to be displaced to the left by n pixels.

Image D in FIG. 2 represents the corresponding depth map based on the disparity for the respective images. The depth in this depth map is encoded such that the brighter the tone, the closer that part of the left image is to the viewer. The circle 105" is brightest and is closest to the viewer. The partially occluded square 11", which is at zero disparity" is mapped onto a grey tone. The background in turn is encoded as black.

Relationship View Information and Depth Information

The inventors of the present invention realized that typical encoding formats for three-dimensional video data focus on either the encoding of multiple view or image plus depth data. However a more versatile three-dimensional video data representation may be obtained by adding depth information to a multi-view signal and moreover adding additional information indicating how that the respective view information relates to the depth information.

Although the latter is not required, it does provide useful information when decoding and rendering the three-dimensional video data.

Below a series of examples of additional information is presented and discussed. In the examples the additional information is encoded using a group classifier and a view classifier. It should however be noted that this particular manner of encoding is preferable, but should not be construed as being the only possible encoding.

The Group classifier used hereafter indicates whether or not view images or depth images relate to the same disparity/depth source material. In this respect images recorded using a multi-view camera are considered to represent related source material and thus receive the same Group classifier. Likewise a depth image based on disparity derived from a stereo pair would also receive the same Group classifier. However a hand-made depth map, such as constructed based on user classification, would not receive the same Group classifier.

The View classifier used hereafter is indicative of the viewing direction of the images. For example, when encoding a stereo pair the View classifiers would typically be 0 and 1, thereby indicating that the right view point is offset by a particular (horizontal) angle. However they might also be indicated relative to a further central view and then indicated as being −½ and +½ respectively. Likewise the views for a five view display may be classified as having view classifiers 0, 1, 2, 3 and 4 or alternatively as −2, −1, 0, 1 and 2.

Figure 3:
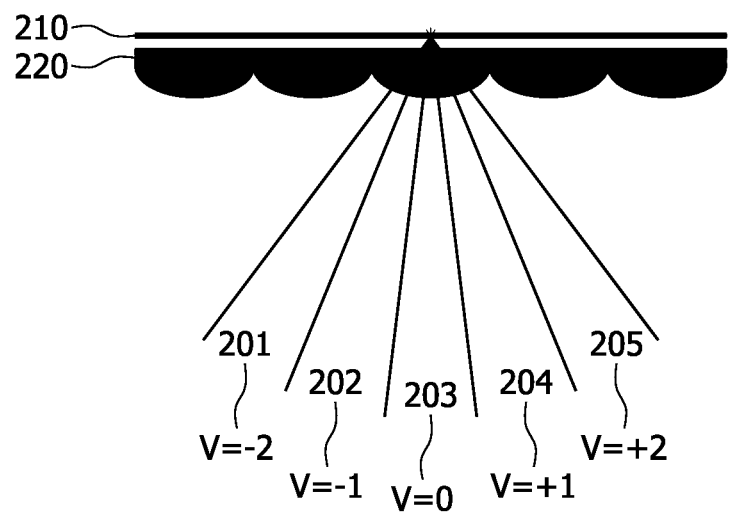
FIG. 3, shows an autostereoscopic display device providing a viewing cone comprising 5 views.

FIG. 3 provides a schematic representation of a top-view of a 5-view autostereoscopic display illustrating the viewing cones as rendered by the autostereoscopic display. Each of the 5 views 201, 202, 204, 204 and 205 are visible within a particular viewing direction. Each of the views is directionally offset by a particular angle. In addition the View classifier for each of these views has been indicated in the image as ranging from V=−2 to V=+2.

TABLE 1

Stereo plus depth.

| Image | Group | View |
|---|---|---|
| $I_0$ | A | 0 |
| $I_1$ | A | 1 |
| $D_0$ | A | 0 |

Table 1, provides an example of additional information entries for indicating a relationships of view and depth information in three-dimensional video data comprising both stereo and depth information. The Group classifier in Table 1 indicates that all depth information and disparity information correspond to the same source material. The View classifier in Table 1 indicates that the depth information in this signal is associated with L. As a result $I_0$ can be used as image information in conjunction with depth information $D_0$ to render further views, e.g. when the signal is rendered on a 5-view autostereoscopic display.

Moreover knowledge of this information may also be used during encoding of the respective views and/or when encoding the depth information.

It will be clear to the skilled person that in case of the 5-view autostereoscopic display if two of the views correspond with $I_0$ and $I_1$ respectively, then it will be preferable to use these rather than to render additional views.

The above information may also be used advantageously for stereoscopic displays, in particular when rendering subtitles or On Screen Display (OSD) information. The depth information in this case provides information as to whether there is room in the three-dimensional viewing space to accommodate such subtitles or OSD information.

The correspondence as indicated by the Group classifier may be used in a strict manner; i.e. to indicate that the depth is inversely proportional to the disparity. However, typically the depth values will be mapped on a depth range, such as values in a 0-255 range. In this case the depth values still preserve the inverse proportional relationship but are effectively scaled by a factor. This factor in turn may also be encoded.

The Group classifier can also be used in a more liberal manner, as it is not uncommon in the process of creating depth maps to transform the depth/disparity data in a manner such that the depth information does not preserve the inverse proportional relationship with disparity. The simplest examples are e.g. situations wherein the actual depth has been clipped. Alternatively, all information in a scene can be moved slightly to the back to create headroom for inserting subtitles. In addition non-linear transforms may be applied which exploit e.g. characteristics of the human visual system in "compacting" the depth map. In case such a transform has been applied it may be beneficial to additionally store information describing the transform and/or the inverse transform.

TABLE 2

Stereo plus hand-made depth.

| Image | Group | View |
|---|---|---|
| $I_0$ | A | 0 |
| $I_1$ | A | 1 |
| $D_0$ | B | 0 |

Table 2, indicates a further example of additional information entries for indicating a relationships of view information in three-dimensional video data comprising stereo plus hand-made depth information.

The Group classifier in Table 2 indicates that the signal comprises two non-corresponding sources of disparity/depth information. In fact the depth information $D_0$ in the three dimensional video data may be based on entirely different disparity/depth information. However, the View classifier indicates that the view of $D_0$ corresponds to that of $I_0$, which in turn indicates that $I_0$ may be used together with $D_0$ to render new views.

When the representation of three-dimensional video data with the above fields is rendered on a stereoscopic shutter glasses based display then preferably the images $I_0$ and $I_1$ are used in the rendering process. However when such content is rendered on a 5-view autostereoscopic display then preferably $I_1$ remains unused and all views are rendered based on $I_0$ and $D_0$. $I_1$ being based on different depth/disparity information might provide conflicting depth cues to those in the synthesized/rendered images when interpreted by the human visual system.

TABLE 3

Stereo plus half-way depth.

| Image | Group | View |
|---|---|---|
| $I_0$ | A | −½ |
| $I_1$ | A | +½ |
| $D_0$ | A | 0 |

Table 3, provides a further example of additional information entries for indicating a relationship of view information in three-dimensional video data comprising stereo plus hand-made depth information. In this example the stereo views are coded for the $I_0$ and $I_1$ image respectively, but the depth information $D_0$ is coded for an image from a viewing angle centered between that of the left and right views respectively. Due to the fact that the left and right are equally displaced with respect to the center image, a single depth map suffices to synthesize images based on either one of the $I_0$ and $I_1$ images and $D_0$.

TABLE 4

Stereo plus disparity-based and hand-made depth.

| Image | Group | View |
|---|---|---|
| $I_0$ | A | 0 |
| $I_1$ | A | 1 |
| $D_0$ | A | 0 |
| $D_1$ | B | 0 |

Table 4, provides an example of additional information entries indicating a relationship of view information in three-dimensional video data comprising stereo plus depth information based on disparity and hand-made depth information.

Although unconventional two depth maps are herein provided, both $D_0$ and $D_1$ are associated with the view of $I_0$, and both enabling the synthesis of further views. By providing two full depth maps, or by providing one full depth map and one partial depth map, additional depth information may be provided.

The depth information $D_1$ may for example relate to a 3D effect. This depth information may subsequently be used to synthesize images based on $I_0$ for visualization on a display. However as depth information $D_1$ is not part of the same group as $I_0$ the thus synthesized images may provide different depth information from that present in the pair $I_0$ and $I_1$.

Instead of using two depth maps $D_0$ and $D_1$ as presented hereinabove, it may be possible to use a single depth map comprising all depth values for a single view and use this together with a binary mask to indicate whether or not the depth/disparity corresponds with the depth/disparity in $I_0$ and $I_1$.

A binary mask as indicated above allows to flag on a per pixel basis (or alternatively on a larger scale e.g. on the macroblock level) whether a particular region belongs to the same group and/or view.

The same information may be represented in other representations that indicate the association between a region and a group/view. For example instead of using a bitmap, the same information could be represented using labeled image segments and/or using labeled elements used in an underlying compression schemes such as e.g. (macro)blocks. In this manner a finer grain representation may be provided.

A finer grain representation may be particularly useful when used in combination with partial images or partial depth maps. The use of partial images and/or partial depth maps may enable a further reduction in bandwidth requirements for the coded three-dimensional vide data. Moreover applications such as an OSD or subtitles typically only require partial images.

In the above manner additional information may be provided that associates parts of an image with a particular view or group classifier or yet another classifier. By providing such information for spatial regions of the image the present invention may be used at a granularity below the image level.

As the additional information will typically be present at encoding of the three dimensional video signal, the information may aid compression, as it enables the compressor to e.g. determine whether $D_0$ can be used to improve data compression of $I_1$, for example by predicting $I_1$ based on $D_0$ and $I_0$.

TABLE 5

Multi-view plus multi-depth.

| Image | Group | View |
|---|---|---|
| $I_0$ | A | $-1\frac{1}{2}$ |
| $I_1$ | A | $-\frac{1}{2}$ |
| $I_2$ | A | $\frac{1}{2}$ |
| $I_3$ | A | $1\frac{1}{2}$ |
| $D_0$ | A | $-\frac{1}{2}$ $(-2\frac{1}{2})$ |
| $D_1$ | A | $\frac{1}{2}$ $(2\frac{1}{2})$ |

Table 5, provides a further example of additional information entries indicating a relationship of view information in three-dimensional video data comprising multi-view information and multiple depth maps.

As indicated by the Group classifier depth/disparity information corresponds. Therefore the depth information may be used to render alternative images. In addition two sets of depth information are encoded, wherein I1 and D0 encode the same view, and I2 and D1 encode the same view. In addition the additional information may provide information indicating which views are preferably rendered using the respective depth information, here indicated in parenthesis.

As already indicated the additional information indicative of the relationship between the multiple images and the depth information is not limited to the type and format presented above.

For example in a particularly simple embodiment of the invention wherein the three-dimensional video data comprises a stereo signal and depth information encoded for use with at least one of the left and right stereo views, the additional information may be a single bit indicating whether the depth information is based on image disparity between the left and right views of the stereo pair.

This single bit may also be complemented by further additional information, e.g. in the form of a further bit, which indicates if the depth information corresponds in a predetermined manner with the disparity in the images. Likewise yet a further bit may indicate which view of the stereo pair is used as reference image for determining disparity. This bit may also be used for indicating which view is preferably used for rendering a two-dimensional representation of the video signal.

Although herein above primarily view information and depth information have been described, more information may be added which e.g. relates occlusion information, when present, with a particular view.

Figure 4:
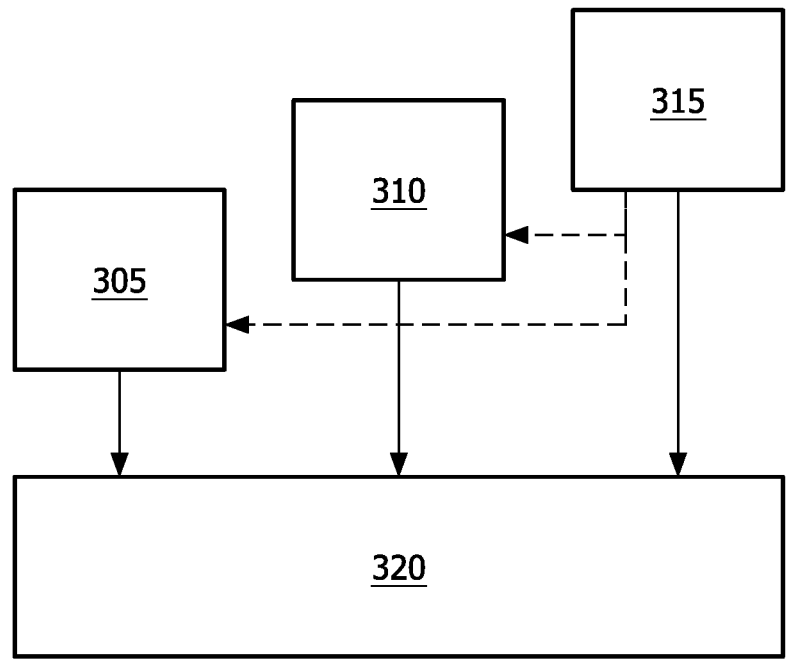
FIG. 4, shows a method of encoding three-dimensional video data according to the present invention.

FIG. 4 provides a block diagram of method of encoding three-dimensional video data. The method comprises a step of encoding 305 of multiple views of a scene from different viewpoints. In practice such encoding may, but need not comprise, compression. Typically the result of the encoding is encoded view information, which may be subject to a particular coding format. The method further comprises encoding 310 of depth information of the scene. The depth information may be in part derived from the disparity information of the respective views, but may alternatively be based on further input such as for example a range finder, or (semi-)manual depth map generation. The method further comprises a step of encoding 315 additional information indicative of a relationship between the multiple images and the depth information.

It is noted here that in a particularly favorable embodiment this additional information may also be used in the encoding of the view information and/or depth information. In practice, in particular when performing compression, it may also be possible to utilize the depth information to aid compression in an advantageous manner.

The additional information may comprise information as described hereinabove. As illustrated in the block diagram the various steps of the method may be executed in parallel, or in case of data-dependencies, e.g. when using the generated additional information as indicated by the broken lines in FIG. 4, it could be executed sequentially or pipelined.

The method further comprises a step wherein the encoded information is combined into a representation of the three-dimensional video data. This representation may e.g. be an electronic signal for transfer to a further device, e.g. using a point to point link, or by means of broadcast over a network. Alternatively this representation may be a file in a file system, for storage or exchange of images or video files between computers.

The representation of the three-dimensional video data may be stored on a storage device (e.g. storage device 525 described below). In particular, the three-dimensional video signal may be stored on a server coupled to a network like internet, on a storage system for distribution by a broadcaster, on a storage medium by a recording device, or stored on a multiple media via an authoring and/or production system for manufacturing record carriers like DVD or Blu-ray Disc. The additional information may be included in the three dimensional video signal and/or on the storage medium at various stages of the storage process. The production process of the record carrier further may comprise the steps of providing a physical pattern of marks in the tracks which embodies the 3D video signal including the additional information, and shaping the material of the record carrier to provide the tracks of marks on at least one storage layer.

FIG. 5 shows a block-diagram of a method of decoding three-dimensional video data. The method presented herein comprises a step of extracting 405 additional information from a representation of the three-dimensional video data. The additional information indicates a relationship between multiple views of a scene from different viewpoints and depth information of the scene. The method further comprises a step of rendering 410 the three-dimensional video data based on the additional information and at least one of the multiple views and the depth information.

The method of decoding preferably involves rendering using the multiple views and the depth information. The additional information provided in accordance with the present invention may also be useful when rendering left and right images. For example, when decoding the three-dimensional video data for rendering on a shutter glasses based stereoscopic display device, the depth information may be used to determine the best position for insertion of OSD information in the three-dimensional scene.

However, in other applications the additional information may be used advantageously to determine whether or not to render the multiple views provided in the representation, or to (optionally) render additional views based on both view and depth information.

Figure 6:
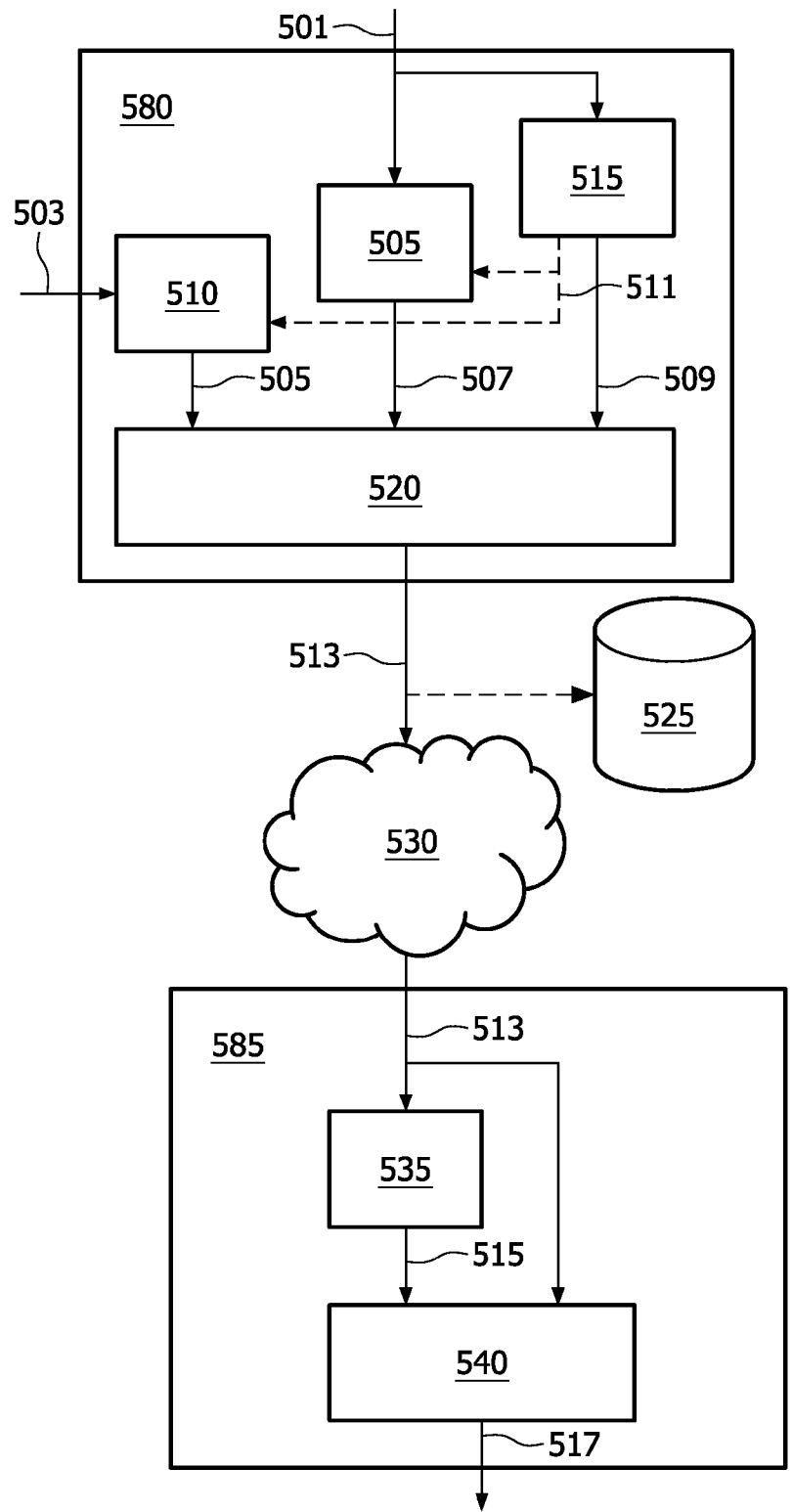
FIG. 6, shows a device for encoding and device for decoding three-dimensional video data according to the present invention.

FIG. 6 shows a block diagram comprising a device 580 for encoding three-dimensional video data in accordance with the present invention as well as a device 585 for rendering three-dimensional video data.

The device 580 for encoding three-dimensional video data comprises: a first encoder 505 arranged to encode multiple views 501 of a scene from different viewpoints, a second encoder 510 arranged to encode depth information of the scene and third encoder 515 arranged to encode additional information indicative of a relationship between the multiple images and the depth information. It is further noted that optionally the third encoder may output information 511 for use in the first and/or second encoder as described above.

In the embodiment shown in this particular figure, the second encoder 510 receives input data 503 other than the multiple views 501. This input may e.g. be the result from a manual depth map generation process, alternatively it may be input generated by an external depth map generation device using the multiple views 501.

The respective outputs 505, 507 and 509 of the first, second and third encoders 505, 510 and 515 are subsequently combined into a representation 513 of the three-dimensional video data by the combiner 520. In case the combiner generates a file representation of the three-dimensional video data, the combiner may be implemented on the Central Processing Unit (CPU), of a computer. Alternatively if the representation is an electronic signal, the combiner may further comprise a Digital to Analog converter and e.g. a line driver circuit.

The representation 513 may be stored on a storage device 525 or alternatively could be transferred over a network 530, to a further device. The further device may e.g. be the device 585 for decoding three-dimensional video data. The device 585 comprises an extractor 535 arranged to extract additional information indicative of a relationship between multiple views of a scene from different viewpoints and depth information of the scene from the representation 513 of the three-dimensional video data. The extractor may be implemented for example on the CPU of a computer or alternatively on a further processing unit in the computer. In case the representation 513 is a file in a particular file format the extractor may e.g. comprise a demultiplexer or a parser for extracting relevant fields or streams from the representation 513.

The device 585 further comprises a rendering means 540 arranged to render the three-dimensional video data based on the additional information and at least one of the multiple views and the depth information. The rendering means may comprise e.g. a software rendering stack which based on image and depth information renders multiple view for display on an autostereoscopic display device.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of encoding three-dimensional video data, the method comprising:
   encoding multiple views of a scene from different viewpoints;
   encoding depth information of the scene;
   encoding additional information indicative of a relationship between the multiple views and the depth information; and
   combining the encoded multiple views, depth information, and additional information into a representation of the three-dimensional video data, the additional information comprising a group classifier which indicates whether the depth information and at least one of the multiple views correspond to the same source material for using the depth information and the at least one of the multiple views to render further views of the scene from further different viewpoints.

2. The method of claim 1, wherein the group classifier comprises information indicating whether the depth information corresponds to disparity information present in at least two of the multiple views.

3. The method of claim 2, wherein the additional information indicates how the depth information relates to the at least two of the multiple views.

4. The method of claim 1, wherein the additional information comprises transform information indicative of a relationship between disparity information present in at least two of the multiple views and the depth information.

5. The method of claim 1, wherein the additional information comprises a view classifier indicating a relationship between the viewpoint of the depth information and the viewpoint of at least one of the multiple views.

6. The method of claim 1, wherein the additional information comprises a group classifier value for each of the multiple views and the depth information, equal group classifier values indicating the correspondence between the viewpoint of the depth information and the respective views.

7. The method of claim 1, wherein the additional information comprises information indicative of the preferred view for rendering the three-dimensional video signal on a two-dimensional display.

8. The method of claim 1 wherein the additional information encodes information indicative of a relationship between the multiple views and the depth information for one or more spatial regions in the multiple views and the depth information.

9. A method of decoding three-dimensional video data, the method comprising:
   extracting additional information from a representation of the three-dimensional video data, the additional information indicative of a relationship between multiple views of a scene from different viewpoints and depth information of the scene, the additional information comprising a group classifier which indicates whether the depth information and at least one of the multiple views correspond to the same source material, and
   rendering the three-dimensional video data based on the additional information by, when the group classifier indicates correspondence, using the depth information and the at least one of the multiple views to render further views of the scene from further different viewpoints.

10. The method of claim 9, wherein the group classifier comprises information indicating whether the depth information corresponds to disparity information present in at least two of the multiple views.

11. A device for encoding three-dimensional video data, the device comprising:
    a first encoder arranged to encode multiple views of a scene from different viewpoints;
    a second encoder arranged to encode depth information of the scene;
    a third encoder arranged to encode additional information indicative of a relationship between the multiple views and the depth information; and
    a combiner arranged to combine the encoded multiple views, depth information, and additional information into a representation of the three-dimensional video data, the additional information comprising a group classifier which indicates whether the depth information and at least one of the multiple views correspond to the same source material for using the depth information and the at least one of the multiple views to render further views of the scene from further different viewpoints.

12. A device for decoding three-dimensional video data, the device comprising:
    an extractor arranged to extract additional information from a representation of the three-dimensional video data, the additional information indicative of a relationship between multiple views of a scene from different viewpoints and depth information of the scene, the additional information comprising a group classifier which indicates whether the depth information and at least one of the multiple views correspond to the same source material, and
    rendering means arranged to render the three-dimensional video data based on the additional information by, when the group classifier indicates correspondence, using the depth information and the at least one of the multiple views to render further views of the scene from further different viewpoints.

13. A non-transitory storage device having embedded thereon a three-dimensional video signal for encoding multiple views of a scene from different viewpoints, encoding depth information of the scene and encoding additional information indicative of a relationship between the multiple images and the depth information, the additional information comprising a group classifier which indicates whether the depth information and at least one of the multiple views correspond to the same source material for using the depth information and the at least one of the multiple views to render further views of the scene from further different viewpoints.

14. The method of claim 2, wherein the group classifier comprises information indicating that the depth information does not correspond to disparity information present in at least two of the multiple views by indicating a relationship of view information in three-dimensional video data comprising stereo plus depth information based on disparity and handmade depth information.

15. The method of claim 10, wherein the group classifier comprises information indicating that the depth information does not correspond to disparity information present in at least two of the multiple views by indicating a relationship of view information in three-dimensional video data comprising stereo plus depth information based on disparity and handmade depth information.

\* \* \* \* \*